United States Patent [19]

Kwoka

[11] Patent Number: 5,162,023

[45] Date of Patent: * Nov. 10, 1992

[54] VISCOUS SHEAR COUPLINGS AND PLATES THEREFOR

[75] Inventor: Georg Kwoka, Siegburg, Fed. Rep. of Germany

[73] Assignee: Viscodrive GmbH, Lohmar, Fed. Rep. of Germany

[*] Notice: The portion of the term of this patent subsequent to Feb. 5, 2008 has been disclaimed.

[21] Appl. No.: 736,710

[22] Filed: Jul. 26, 1991

Related U.S. Application Data

[63] Continuation of Ser. No. 376,314, Jul. 6, 1989, Pat. No. 5,041,065.

[30] Foreign Application Priority Data

Aug. 22, 1988 [DE] Fed. Rep. of Germany ....... 3828421

[51] Int. Cl.⁵ .................... F16H 1/44; F16D 31/00
[52] U.S. Cl. ..................... 475/87; 192/58 B; 192/58 C; 180/248; 475/234
[58] Field of Search .............. 74/650; 475/224, 234, 475/230, 231, 87; 192/58 B, 58 C; 180/248

[56] References Cited

U.S. PATENT DOCUMENTS

| | | | |
|---|---|---|---|
| 1,315,236 | 9/1919 | Parker | 475/230 X |
| 3,760,922 | 9/1973 | Rott et al. | 192/111 B |
| 4,058,027 | 11/1977 | Webb | 192/58 C X |
| 4,650,028 | 3/1987 | Eastman et al. | 74/650 X |
| 4,836,051 | 6/1989 | Guimbrtic | 475/230 X |
| 4,885,957 | 12/1989 | Taureg | 180/248 X |
| 4,989,687 | 2/1991 | Kwoka et al. | 475/85 X |

FOREIGN PATENT DOCUMENTS

| | | |
|---|---|---|
| 3632283 | 2/1988 | Fed. Rep. of Germany . |
| 3702299 | 3/1988 | Fed. Rep. of Germany . |
| 3828422 | 4/1989 | Fed. Rep. of Germany . |
| 62-137429 | 6/1987 | Japan .................. 192/58 B |
| 766948 | 1/1957 | United Kingdom .......... 192/58 C |

Primary Examiner—Leslie A. Braun
Assistant Examiner—Benjamin Levi
Attorney, Agent, or Firm—Anderson Kill Olick & Oshinsky

[57] ABSTRACT

A plate for a viscous shear coupling has inner and outer peripheries and slots which extend partly across the radial dimension between the peripheries. Between each adjacent pair of slots is a land and this is deformed out of the general plane of the disc to provide oppositely inclined surfaces.

14 Claims, 5 Drawing Sheets

VISCOUS SHEAR COUPLINGS AND PLATES THEREFOR

This is a continuation of Ser. No. 07/376,314, filed Jul. 6, 1989, now U.S. Pat. No. 5,041,065.

BACKGROUND TO THE INVENTION

1. Field of the Invention

This invention relates to viscous shear couplings and to plates therefor. Such couplings find particular, but not exclusive, use in the drive transmissions of motor vehicles.

2. Description of Prior Art

A viscous shear coupling, as described for example in United Kingdom Patent Specification 1,357,106 (and corresponding U.S. Pat. No. 3,760,922 issued 25th Sep. 1973) comprises a housing part, a hub part within the housing part, the parts being relatively rotatable about a common axis, and two sets of interleaved planar plates which are provided with slots or holes. The plates of one of the sets are rotatable with the housing part and the plates of the other set are rotatable with the hub part. The plates of one of the sets are axially movable into contact with the plates of the other set. The housing part contains a viscous liquid such, for example, as a silicone oil.

Normally torque is transmitted between the housing part and the hub part due to shearing forces in the viscous liquid between adjacent plates, i.e. in viscous mode. The above patent specifications describe that the housing part may be filled with viscous liquid to a fill factor which leaves part of the housing normally filled with air or gas.

Such couplings exhibit a phenomenon which has come to be known as the "hump" mode in which the plates of the two sets come into contact and torque is transmitted by metallic friction and/or mixed friction between the plates.

Prolonged slipping of the coupling in viscous mode causes heating and expansion of the silicone oil. When the oil has expanded to fill the entire space within the coupling there is a sharp increase in pressure in the coupling and, due to the throttling effect between adjacent plates, the plates of one set are moved into contact with the plates of the other set by the fluid pressure in the coupling.

It has been proposed in DE-PS 3632283 to form the apertures in plates for viscous shear couplings in such a way that the apertures have thickened edges. These edges act as scraping edges to scrape off the viscous liquid when the coupling approaches the hump mode and therefore facilitate the transition of the coupling from viscous mode to hump mode.

SUMMARY OF THE INVENTION

It is an object of one aspect of the present invention to provide an improved form of plate which will facilitate the transition of the coupling from viscous mode to hump mode.

According to this aspect of the invention we provide a plate for use in a viscous shear coupling and which comprises a generally planar annular disc having inner and outer peripheries and a plurality of circumferentially spaced slots extending at least partly across the radial dimension of the disc defined between said peripheries, and wherein the disc is deformed out of its general plane between each adjacent pair of slots so as to provide a pair of surfaces which are oppositely inclined to said plane when viewed in a direction radial of the disc, the surfaces being arranged alongside at least parts of the slots.

The advantage of this construction is that, when there is relative rotation between the housing part and the hub part, the viscous fluid acts on the inclined surfaces to produce a force substantially normal thereto. This force may be resolved into a force generally perpendicular to the plane of the plate and a force in the plane of the plate. The force which is perpendicular to the plane of the plate is resisted by the surface tension of the liquid between adjacent plates until as hump mode is approached the pressure in the coupling increases and the force assists in moving the plate so that it comes into contact with its adjacent plate as hump mode is approached.

Furthermore, by means of the deformations, sharp edges are provided to the slots and these edges assist in removing the viscous liquid from the planar face of an adjacent plate so that the two plates can come into frictional engagement in the hump mode.

In one arrangement, each pair of inclined surfaces forms a V when viewed in said radial direction. In another embodiment, each pair of inclined surfaces is joined by an arcuate surface.

Preferably, the slots are generally radial and open at one of the inner and outer peripheries of the disc.

According to another aspect of the invention we provide a viscous shear coupling comprising a housing part, a hub part rotatably mounted within the housing part and extending therefrom in sealed relation thereto, two sets of interleaved annular plates in the housing part, the plates of one of said sets being rotatable with the housing part and the plates of the other set being rotatable with the hub part, the plates of at least one of the sets being independently and axially movable with respect to the part with which they are rotatable so as to be capable of coming into contact with the plates of the other set, and a viscous liquid in the housing part, and wherein each of the plates of at least said one set the plates of which are axially movable comprises a generally planar annular disc having inner and outer peripheries and a plurality of circumferentially spaced slots extending at least partly across the radial dimension of the disc defined between said peripheries, and wherein the disc is deformed out of its general plane between each adjacent pair of slots so as to provide a pair of surfaces which are oppositely inclined to said plane when viewed in a direction radial of the disc, the surfaces being arranged alongside at least parts of the slots; and wherein the plates of the other set are planar.

Preferably the plates of the set of plates rotatable with the hub part are axially movable. In a preferred arrangement, a pair of the plates rotatable with the hub part is located between each two adjacent plates rotatable with the housing part. In this latter arrangement the inclined surfaces on the plates of each said pair may be mutually aligned. This design ensures that, as the hump mode approaches, the plate carried by the hub part will move apart more quickly and that each plate carried by the housing part is supported by two plates carried by the hub part so that deformation or "dishing" of the plates carried by the housing part is avoided. By this arrangement a higher torque capability is provided in the hump mode than couplings in which the plates of the sets alternate.

The plates carried by the housing part may be axially fixed and spaced apart or may be movable. It is preferred that the plates are fixed since this gives better contact conditions during hump mode.

A viscous shear coupling embodying the invention is advantageously usable in the drive line of a motor vehicle, especially in combination with a differential gear. In the latter arrangement the coupling acts across the differential gear to restrict differential action thereof in a known manner.

BRIEF DESCRIPTION OF THE DRAWINGS

The invention will now be described in detail by way of example with reference to the accompanying drawings in which.

DESCRIPTION OF PREFERRED EMBODIMENTS

Figure 1:
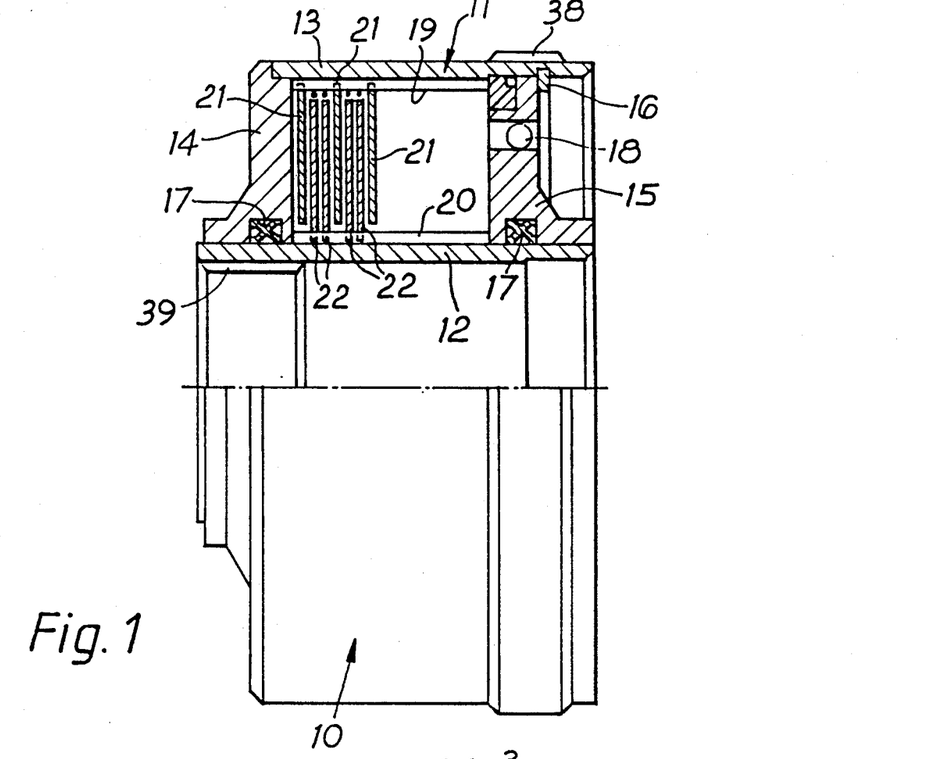
FIG. 1 is a part section through a viscous shear coupling embodying the invention.

Referring now to FIG. 1, the viscous coupling is indicated generally at 10 and comprises a housing part 11 and a hub part 12. The housing part 11 comprises a sleeve 13 to which is welded one end plate 14. Another end plate 15 is held in position in the sleeve by a circlip 16. The hub part 12 is rotatable within bores in the end plates 14 and 15 and is sealed thereto by running seals 17. The coupling may be filled with a viscous liquid, e.g. silicone oil, through a filling device 18.

The housing part is provided with internal splines 19 and the hub part with external splines 20. Two sets of plates are mounted in the housing. There is a set of plates, some of which are indicated at 21 which are splined to the housing part 11. There is a second set of plates some of which are indicated at 22 which are splined to the hub part. It will be seen from FIG. 1 that between each adjacent pair of plates 21 is located a pair of plates 22. The plates 21 are planar while the plates 22 have the configuration shown in FIGS. 2 to 4.

Figure 2:
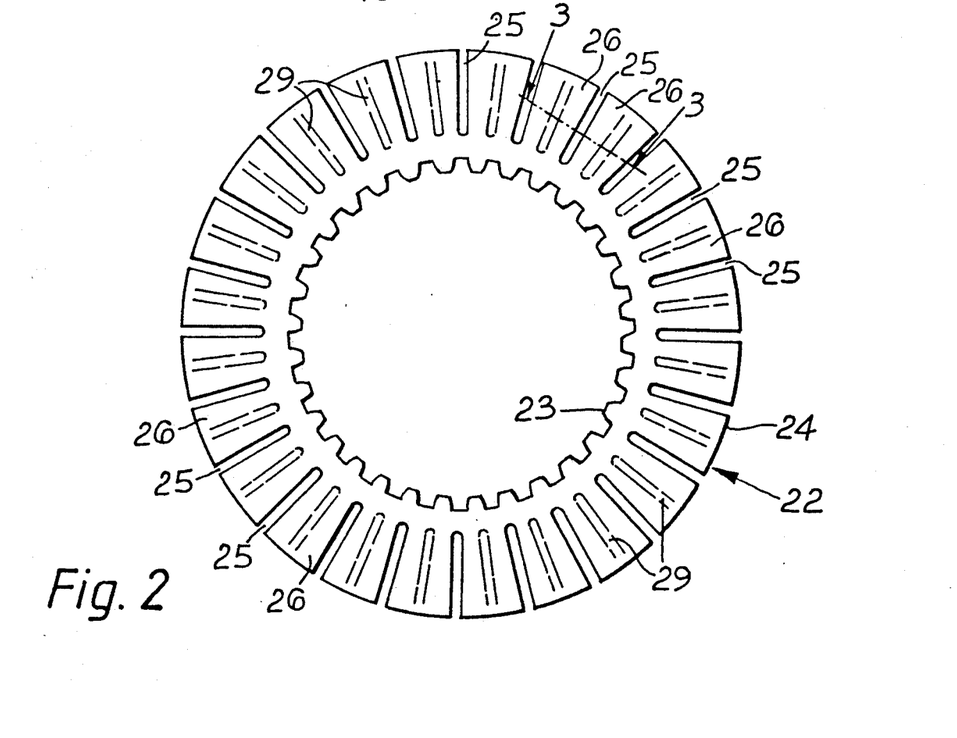
FIG. 2 is a side elevation on a larger scale of one of the plates used in the coupling of FIG. 1.
Figure 3:
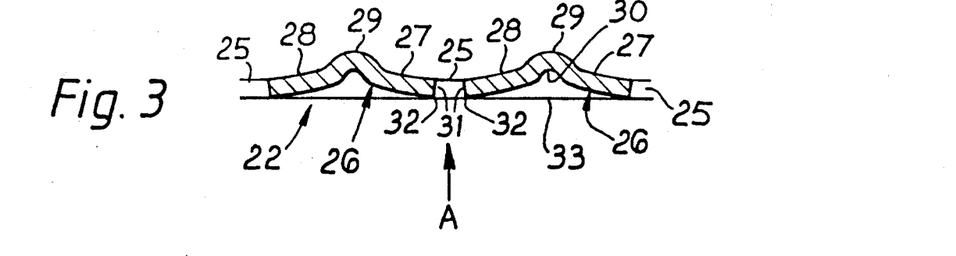
FIG. 3 is a cross section through part of the plate of FIG. 1 on the line 3—3.

Referring now to FIGS. 2 and 3 a plate 22 is in the form of a generally planar disc, having an inner periphery 23 which is splined to receive the splines 20 and an outer periphery 24. The disc is provided with a plurality of circumferentially spaced slots some of which are indicated at 25 and which extend partly across the radial dimension of the disc between the peripheries 23 and 24 and which open into the outer periphery 24.

Between each adjacent pair of slots is a land; some of these are indicated at 26. As is clear from FIG. 3, each land has been deformed out of the general plane of the disc and provides two oppositely inclined surfaces indicated at 27 and 28. The inclined surfaces of each pair are joined by an arcuate surface 29. The disc may be formed to this shape by pressing by inserting a pressing tool into the position shown for example at 30. The inclined surfaces are shown as extending along the whole lengths of the slots but if desired may extend only part way along such length.

Because of the deformation of the lands 26, the portions of the lands which provide the inclined surfaces 27 and 28 are inclined to the general plane of the disc and thus the walls such as those shown at 31 of the slots 25 converge in the direction of the arrow A in FIG. 3 and thus provide sharp edges 32 on the face 33 of the disc which, as will be described, help to scrape off the viscous fluid from the surfaces of the plates 21 as hump mode is approached.

Figure 5:
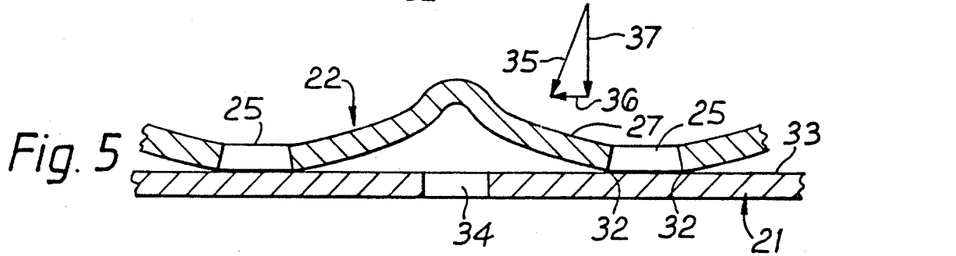
FIG. 5 is a diagram to illustrate the force which is applied to a plate embodying the invention in operation.

This is shown more clearly in FIG. 5 which shows a portion of a plate 21 and a portion of a plate 22 in engagement. It will be seen that the sharp edges 32 are engaged with the face 33 of the planar disc 21 which is provided with apertures, one of which is shown at 34, located so as to be out of alignment with the slots 25.

Figure 6:
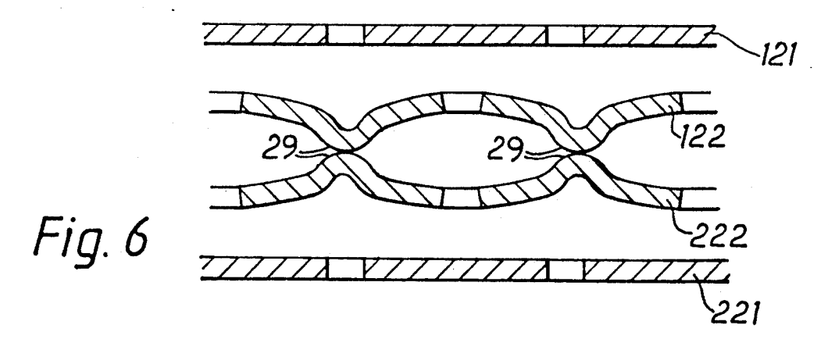
FIG. 6 is a detailed cross section showing plates of the coupling in the positions they occupy in viscous mode.
Figure 7:
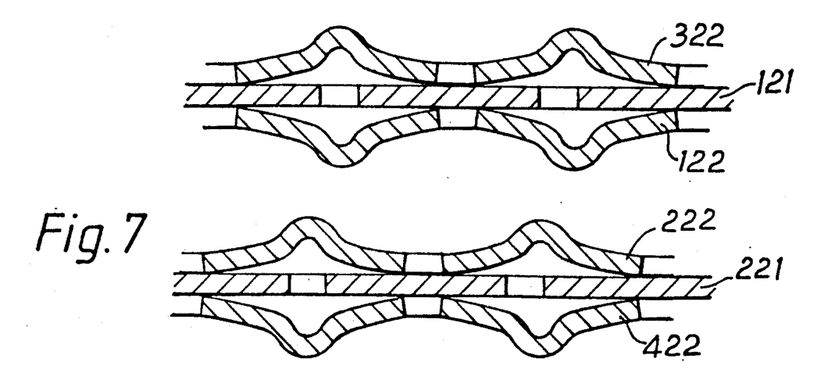
FIG. 7 is a view similar to FIG. 6 but showing the positions occupied by the plates in hump mode.

FIG. 6 shows two plates 21 which are indicated at 121 and 221 respectively. Between these plates are two plates 22 which are indicated at 122 and 222 respectively. FIG. 6 shows the arrangement of the plates in the viscous mode. It will be seen that the arcuate surfaces 29 of the two plates 122 and 222 are in alignment and may engage. As the pressure in the coupling increases due to increase in temperature of the viscous fluid consequent upon prolonged relative rotation between the housing part and the hub part the inner plates 122 and 222 are moved apart under the unbalanced pressure into engagement with the plates 121 and 221 as shown in FIG. 7. Additional inner plates on the other sides of the outer plates 121 and 221 are indicated in FIG. 7 as 322 and 422.

It will be seen that each outer plate 121 and 221 is supported by two inner plates and that the edges 32 of the slots 25 are in engagement with the planar surfaces of the outer plates 121 and 221 and thus as relative rotation takes place they scrape the silicone oil off the surfaces of the plates 121 and 221 so that good frictional engagement takes place between the edges 32 and the surfaces of the plates 121 and 221. The oil scraped off can move outwardly through the slots 25.

The outward movement of the plates 122 and 222 from the positions shown in FIG. 6 to the positions shown in FIG. 7 as hump mode approaches is facilitated by a hydro-dynamic force which is generated when there is relative rotation between the plates 22 and the viscous liquid. Thus, referring to FIG. 5, the force is there shown as being normal to a surface 27 and is indicated by the arrow 35. This force can be resolved into a force indicated by the arrow 36 which is generally parallel to the plane of the plate and a force 37 which is perpendicular to said plane and therefore which assists in moving the plates apart from the positions shown in FIG. 6 to the positions shown in FIG. 7. The perpendicular force 37 is resisted by surface tension of the liquid between the plates when the coupling is operating in viscous mode but as the pressure increases as hump mode approaches, the force 37 helps to move the plates apart.

The combination of the sharp edges 32 which scrape off the viscous fluid from the surfaces of the plates 21 thus allowing good frictional contact between the edges 32 and the surfaces of the plates 21 together with the force component 37 gives a very good result in the hump mode.

Returning now to FIG. 1, the coupling may be connected in the drive line of a motor vehicle and for this purpose the housing part 11 is provided with external splines 38 and the hub part 12 with internal splines 39.

Figure 8:
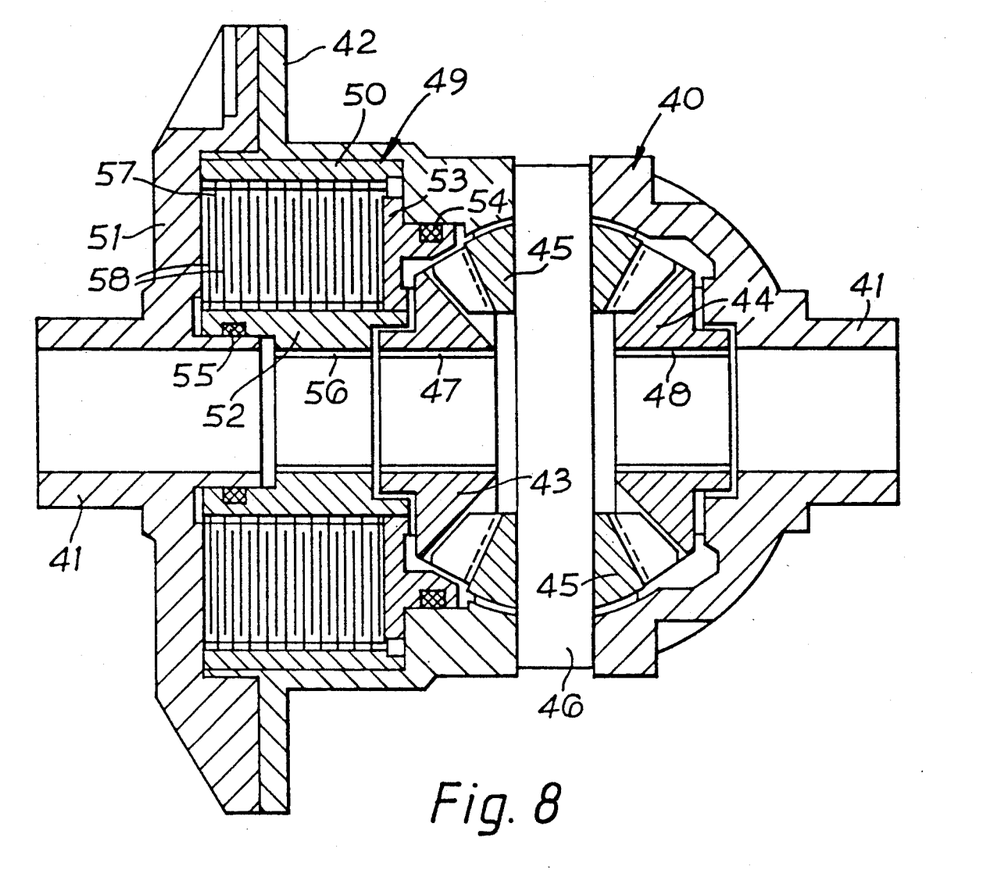
FIG. 8 is a section through a combined viscous shear coupling and differential gear embodying the invention.

Referring now to FIG. 8, this shows a viscous coupling embodying the invention in combination with a differential gear. In this figure, the differential carrier is indicated at 40 and has bearing spigots 41 for receiving bearings whereby it may be mounted for rotation in a housing. The carrier will be driven by a crown wheel, not shown, connected to the flange 42.

The differential is of conventional bevel gear form having side gears 43 and 44 and planet gears 45 which mesh with the side gears and which are mounted on a planet pin 46. There will normally be two such pairs of planet gears. The side gears 43 and 44 are internally splined at 47 and 48 respectively to receive drive shafts (not shown).

A viscous shear coupling indicated generally at 49 is mounted in the carrier and comprises a housing part 50 which is secured in the carrier, one end being formed by a part 51 of the carrier. The viscous shear coupling comprises also a hub part 52 which is secured to a member 53 sealed at 54 to the carrier. The hub part is also sealed at 55 to the carrier. The hub part is internally splined at 56, the splines 47 and 56 being aligned so that the hub 52 and the side gear 43 can be connected together by the splined end of a drive shaft, not shown.

The viscous shear coupling includes two sets of plates, outer plates 57 which are splined to the housing part 50 and inner plates 58 which are splined to the hub part. The plates alternate in the housing part which contains the viscous fluid e.g. silicone oil.

Figure 4:
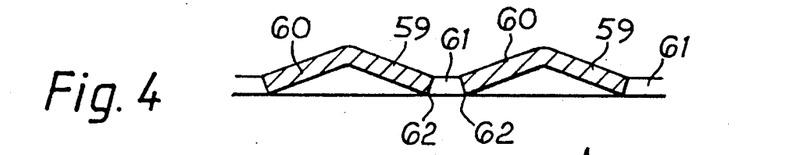
FIG. 4 is a view similar to FIG. 3 but of a different embodiment.
Figure 9:
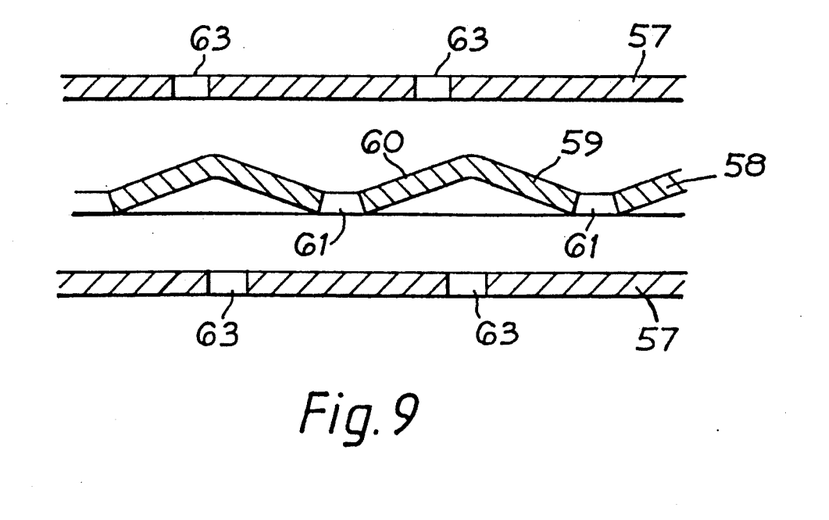
FIG. 9 is a part section through the plates of the coupling of FIG. 8.

The outer plates 57 are planar as indicated in FIG. 9 while the inner plates are generally of the shape shown in FIG. 2 but the lands 26 are deformed as shown in FIG. 4. Thus referring to that figure, each land provides two oppositely inclined surfaces 59 and 60 and these are substantially in the form of a V when viewed radially of the plate. As before the slots, here indicated at 61, between the lands are provided with sharp edges 62. The outer plates 57 are apertured at 63 with the apertures out of alignment with the slots in the inner plates 58.

The operation of the coupling is substantially as above described except that in this case, since the inner and outer plates alternate, each outer plate will, in the hump condition, only be in engagement with one inner plate. The plates in the coupling 49 could be arranged as described in relation to FIG. 1, i.e. with the plates of one set arranged in pairs between adjacent plates of the other set. In the arrangement shown in FIG. 9 the hydro-dynamic force on the surfaces 59 and 60 will move the plate 58 downwardly into engagement with the lower plate 57 in that figure.

Returning to FIG. 8, it will be appreciated that the input to the differential gear will be via the crown wheel to the carrier 40 and the outputs will be via drive shafts from the side gears 43 and 44. The viscous shear coupling 49 is connected between the side gear 43, by virtue of the drive shaft engaging the splines 47 and 56, and the carrier 40 and will thus restrict differential action of the differential gear.

Figure 10:
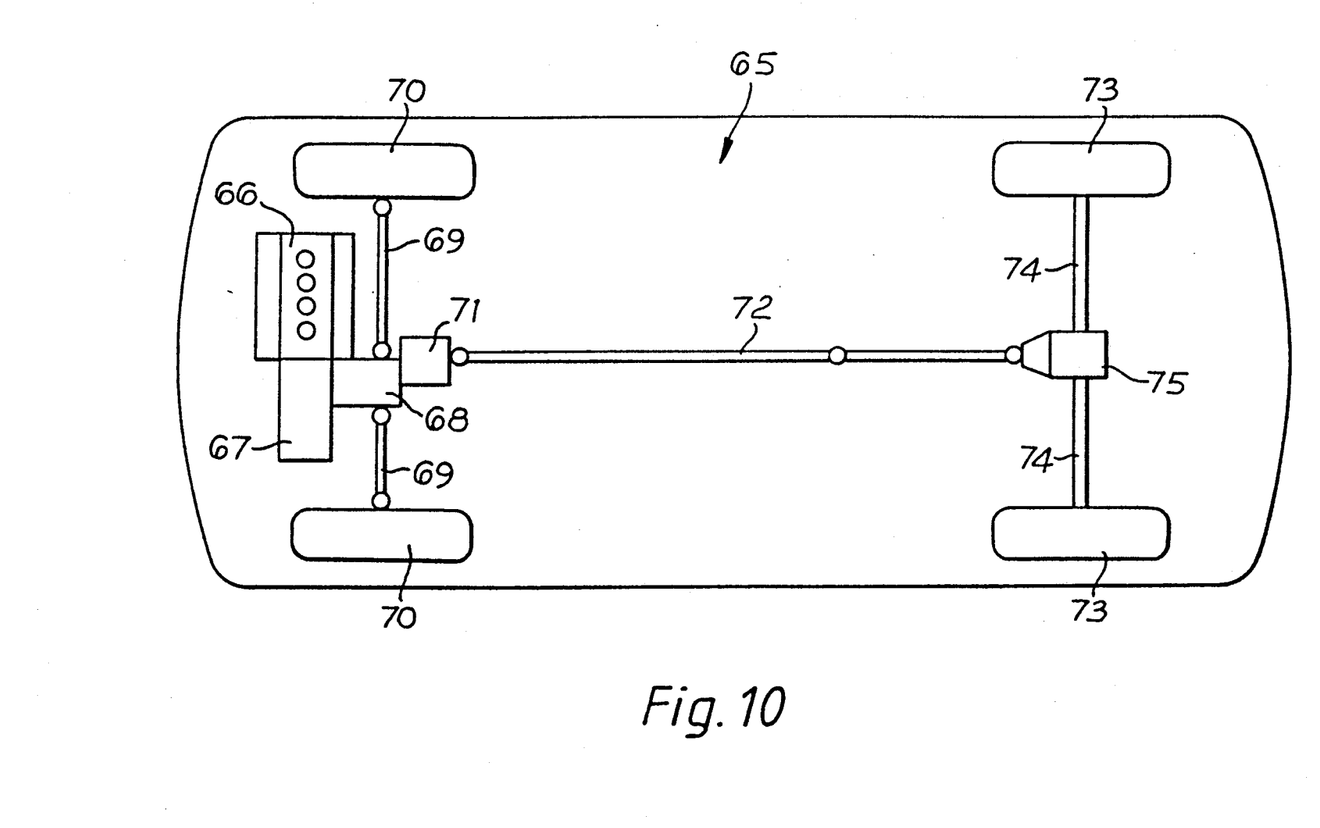
FIG. 10 is a diagram illustrating the application of the invention to a motor vehicle.

FIG. 10 digrammatically indicates a motor vehicle 65 having a prime mover 66 and a gear box 67 which drives an inter-wheel differential 68. This drives through drive shafts 69 to front road wheels 70. An inter-axle differential gear 71 is driven from the inter-wheel differential 68 and this drives a propeller shaft 72 to drive rear road wheels 73 via drive shafts 74 and an inter-wheel differential 75.

Any or all of the differentials 68, 71 and 75 could be in the form of the assembly shown in FIG. 8. Alternatively, where there is a viscous transmission, the inter-axle differential 71 may be replaced by the viscous shear coupling shown in FIG. 1.

Figure 11:
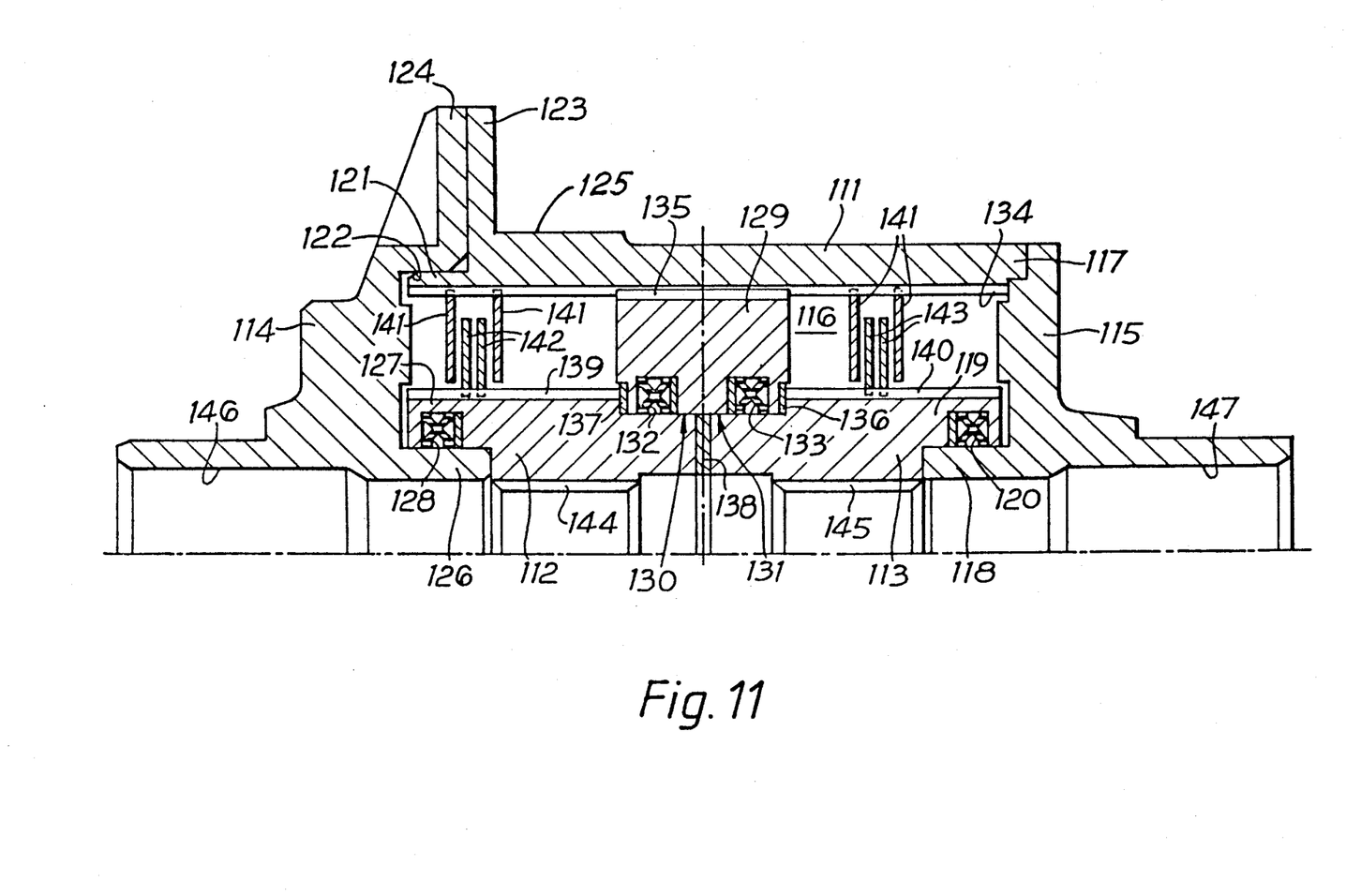
FIG. 11 is a section through a three member viscous shear coupling embodying the invention.

FIG. 11 of the drawings shows a viscous shear coupling suitable for replacing both of the differential gears 71 and 75 in the vehicle of FIG. 10. The coupling comprises a housing 111 and two inner hub parts 112 and 113. The housing and hub parts form, with left and right hand cover members 114 and 115, an enclosure 116.

The right hand end of the housing 111 fits into a recess 117 in the cover member 115 which has an inwardly extending projection 118 which overlaps a reduced thickness outer end portion 119 of the hub part 113. A ring seal 120 seals the portion 119 to the projection 118 allowing the hub part 113 to rotate relative to the cover member 115 in a fluid-tight manner.

The left hand end of the housing 111 has a reduced diameter portion 121 which fits in a recess 122 in the cover member 114. The housing 111 has a flange 123 which mates with a flange 124 on the cover member 114. The housing also has a cylindrical seat 125 to receive a crown gear, not shown, which may be bolted to the coupling with bolts passing through the flanges 123 and 124 or, if desired, the flange 123 only. The crown gear would be driven by the shaft 72 in FIG. 10 directly from the gear box 67.

The cover member 114 has an inwardly extending projection 126 which overlaps a reduced thickness outer end portion 127 of the hub part 112 and is sealed thereto by a ring seal 128 so that the hub part 112 can rotate relative to the cover member 114 in a fluid-tight manner.

A common central member 129 of annular shape is received in the enclosure and overlaps reduced diameter inner end portion 130 and 131 of the hub parts 112 and 113 respectively. The central member is sealed to the hub parts by ring seals 132 and 133 respectively which seal the central member to the hub parts so that the latter can rotate relative thereto in a fluid-tight manner.

The inner surface of the housing 111 is splined at 134 and the outer periphery of the member 129 is splined at 135 to mate with the splines 134. The member 129 is located on the hub parts by rings 136 and 137.

A thrust ring 138 is received between the juxtaposed inner ends of the hub parts 112 and 113. The latter have external splines 139 and 140. Plates 141 are splined to the splines 134 and are interleaved with plates 142 and 143 splines to the splines 139 and 140 respectively. The plates 142 and 143 will be of one of the forms shown in FIGS. 3 to 7 and the plates 141 will be planar. The plates 142 and 143 are arranged in pairs between each two adjacent plates 141. Alternatively the plates 141 may be of the form shown in FIGS. 3 to 7 and arranged in pairs between each two adjacent plates 142 and 143 which will be planar. If desired the plates 141, 142 and 143 could alternate as shown in FIG. 8.

The enclosure is partially filled with a viscous liquid. Conveniently it may be filled to about 80% of its total volume. Fluid is prevented from escaping from the enclosure by the ring seals 120, 128, 132 and 133 which nevertheless allow the hub parts 112 and 113 to rotate relative to each other and to the assembly of the housing 111 and the cover members 114 and 115.

The bores of the hub parts 112 and 113 have internal splines at 144 and 145 and receive the inner ends of axle shafts 74 of FIG. 10 which pass through bores 146 and 147 in the cover members 114 to drive the rear wheels 73.

I claim:

1. A viscous shear coupling comprising a housing part, a hub part rotatably mounted within the housing part and extending therefrom in sealed relation thereto, two sets of interleaved annular plates in the housing part, the plates in the housing part, the plates of a first one of said sets being rotatable with the housing part and the plates of a second one of said sets being rotatable with the hub part, the plates of one of said first and said second sets being independently and axially movable with respect to the part with which they are rotatable so as to be capable of coming into contact with the plates of the other of said first and said second sets, and a viscous liquid in the housing part, and wherein each of the plates of said second set the plates of which are axially movable comprises a generally planar annular disc having inner and outer peripheries and a plurality of circumferentially spaced slots extending radially at least partly across a dimension of the disc defined between said peripheries, and wherein the disc is deformed out of its general plane between each adjacent pair of slots so as to provide a pair of surfaces which are oppositely inclined to said plane when viewed in a direction radial of the disc, the surfaces being arranged alongside at least parts of the slots; and wherein the plates of the first set are planar and at a fixed spacing from each other.

2. A coupling according to claim 1, wherein each pair of said inclined surfaces forms a V when viewed in said radial direction.

3. A coupling according to claim 1, wherein each pair of said inclined surfaces is joined by an arcuate surface.

4. A coupling according to claim 1, wherein said slots are generally radial and open at one of said peripheries.

5. A coupling according to claim 1, wherein plates of the second set of plates rotatable with the hub part are axially movable.

6. A coupling according to claim 5, wherein a pair of the plates rotatable with the hub part is located between each two adjacent plates rotatable with the housing part.

7. A coupling according to claim 6, wherein the inclined surfaces on the plates of each said pair are mutually aligned.

8. A viscous shear coupling according to claim 1, comprising an additional hub part within the housing part, the two hub parts being relatively rotatable about said axis; and wherein one of said sets of annular plates comprises two groups the plates of which are interleaved with the plates of the other set and one group of said one set of plates being rotationally fast with one hub part while the other group is rotationally fast with the other hub part.

9. A coupling according to claim 8, wherein each pair of said inclined surfaces forms a V when viewed in said radial direction.

10. A coupling according to claim 8, wherein each pair of said inclined surfaces is joined by an arcuate surface.

11. A coupling according to claim 8, wherein said slots are generally radial and open at one of said peripheries.

12. The combination of a differential gear which comprises three interconnected gearing elements and a viscous shear coupling comprising a housing part, connected to one of said elements, a hub part rotatably mounted within the housing part and extending therefrom in sealed relation thereto and connected to another of said elements, two sets of interleaved annular plates in the housing part, the plates of a first one of said sets being rotatable with the housing part and the plates of a second one of said sets being rotatable with the hub part, the plates of one of the sets being independently and axially movable with respect to the part with which they are rotatable so as to be capable of coming into contact with the plates of the other set, and a viscous liquid in the housing part, and wherein each of the plates of said second set the plates of which are axially movable comprises a generally planar annular disc having inner and outer peripheries and a plurality of circumferentially spaced slots extending radially at least partly across a dimension of the disc defined between said peripheries, and wherein the disc is deformed out of its general plane between each adjacent pair of slots so as to provide a pair of surfaces which are oppositely inclined to said plane when viewed in a direction radial of the disc, the surfaces being arranged alongside at least parts of the slots; and wherein the plates of the first set are planar and at a fixed spacing from each other.

13. A motor vehicle comprising a prime mover, road wheels, a drive line between the prime mover and some of the road wheels to drive the latter from the prime mover, the drive line comprising three parts which are interconnected gearing elements each connected to a respective part of the drive line and a viscous shear coupling comprising a housing part, connected to one of said elements, a hub part rotatably mounted within the housing part and extending therefrom in sealed relation thereto and connected to another of said elements, two sets of interleaved annular plates in the housing part, the plates of a first one of said sets being rotatable with the housing part and the plates of a second one of said sets being rotatable with the hub part, the plates of one of the sets being independently and axially movable with respect to the part with which they are rotatable so as to be capable of coming into contact with the plates of the other set, and a viscous liquid in the housing part, and wherein each of the plates of said second set the plates of which are axially movable comprises a generally planar annular disc having inner and outer peripheries and a plurality of circumferentially spaced slots extending radially at least partly across a dimension of the disc defined between said peripheries, and wherein the disc is deformed out of its general plane between each adjacent pair of slots so as to provide a pair of surfaces which are oppositely inclined to said plane when viewed in a direction radial of the disc, the surfaces being arranged alongside at least parts of the slots; and wherein the plats of the first set are planar and at a fixed spacing from each other.

14. A motor vehicle comprising a prime mover, road wheels, a first drive line between the prime mover and a first pair of road wheels, a second drive line between the primer mover and a second pair of road wheels, said second drive line including a viscous shear coupling comprising a housing part connected to the second drive line, first and second hub parts mounted within the housing for rotation relative to the housing about an axis and connected respectively to the road wheels of said second part, two sets of interleaved annular plates in the housing part, the plates of a first one of said sets being rotatable with the housing part and the plates of a second one of said sets being arranged in two groups which are rotatable with said first and second hub parts respectively, the plates of one of the sets being independently and axially movable with respect to the part with which they are rotatable so as to be capable of coming into contact with the plates of the other set, and a viscous liquid in the housing part, and wherein each of the plates of said second set the plates of which are axially movable comprises a generally planar annular disc having inner and outer peripheries and a plurality of circumferentially spaced slots extending radially at least partly across a dimension of the disc defined between said peripheries, and wherein the disc is deformed out of its general plane between each adjacent pair of slots so as to provide a pair of surfaces which are oppositely inclined to said plane when viewed in a direction radial of the disc, the surfaces being arranged alongside at least parts of the slots; and wherein the plates of the first set are planar and at a fixed spacing from each other.

* * * * *